(12) United States Patent
Phelan

(10) Patent No.: US 8,627,485 B1
(45) Date of Patent: Jan. 7, 2014

(54) DIGITAL CINEMA DISTRIBUTION METHOD AND APPARATUS

(75) Inventor: Kenneth Phelan, Crick (GB)

(73) Assignee: Flix Innovations Ltd. (GB)

( * ) Notice: Subject to any disclaimer, the term of this patent is extended or adjusted under 35 U.S.C. 154(b) by 52 days.

(21) Appl. No.: 13/106,628

(22) Filed: May 12, 2011

Related U.S. Application Data

(60) Provisional application No. 61/334,360, filed on May 13, 2010.

(51) Int. Cl.
*G06F 7/04* (2006.01)

(52) U.S. Cl.
USPC ............................. 726/26; 726/31; 380/201

(58) Field of Classification Search
USPC .................. 726/26, 31; 380/201, 210, 217
See application file for complete search history.

(56) References Cited

U.S. PATENT DOCUMENTS

| | | | |
|---|---|---|---|
| 2007/0171374 A1 | 7/2007 | Moore et al. | |
| 2008/0198925 A1* | 8/2008 | Sayre | 375/240.01 |
| 2008/0281872 A1* | 11/2008 | Mizuno | 707/200 |
| 2009/0112676 A1* | 4/2009 | Reich et al. | 705/8 |
| 2009/0144542 A1* | 6/2009 | Wetmore et al. | 713/156 |
| 2009/0282774 A1* | 11/2009 | Jensen et al. | 52/698 |
| 2010/0246826 A1* | 9/2010 | Ogura et al. | 380/277 |

OTHER PUBLICATIONS

Wikipedia, "Digital Cinema Initiatives," accessed on May 3, 2011.
Digital Cinema Initiatives, LLC, "Digital Cinema System Specification," Mar. 7, 2008.

* cited by examiner

*Primary Examiner* — Christopher Brown
(74) *Attorney, Agent, or Firm* — Dwayne E. Rogge; Schacht Law Office, Inc.

(57) ABSTRACT

Disclosed herein is an improved (digital) supply chain (ISC) product. The disclosure covers a simple explanation of the improved supply chain as a service business model, a review of key digital cinema (D-Cinema) topics, a description of the Digital Cinema supply chain, and finally, a description of the improved supply chain product and process.

6 Claims, 12 Drawing Sheets

DIGITAL CINEMA DISTRIBUTION METHOD AND APPARATUS

RELATED APPLICATIONS

This application claims priority benefit of U.S. Ser. No. 61/334,360, filed May 13, 2010.

BACKGROUND OF THE DISCLOSURE a) Field of the Disclosure

This disclosure describes a system and process for widespread distribution of digital media across multiple studios, distributors and cinemas.

SUMMARY OF THE DISCLOSURE

Disclosed herein is a software as service method for distributing a digital representation of a cinematic production, in one form, comprising the following steps: a studio producing a digital source master (DSM) of the cinematic production, the studio distributing the DSM to at least one distributor, the distributor producing a digital cinema distribution master (DCDM) from the DSM, and the distributor compressing the DCDM to a digital cinema package (DCP). The distributor may then produce a key delivery message (KDM) unique to each DCP and cinema in the distributor's distribution chain. The steps may include selecting the cinematic production represented by the DCP from a list of cinematic productions, selecting a priority type associated with delivery of the selected DCP, and identifying a transfer begin and end time of the selected DCP. The method may also include the steps of booking electronic delivery of the DCP to the cinema based upon the priority type selected, transfer time required and the transfer begin/end time; booking electronic delivery of the DCP based also upon the priority type selected, transfer time required, the transfer begin/end time of a competing transfer to the same cinema; and electronically delivering the DCP and KDM to the cinema.

The method disclosed above may also include the steps of booking electronic delivery of the DCP to the cinema based upon the priority type selected, transfer time required, and the transfer begin/end time, as well as booking electronic delivery of the DCP based also upon the priority type selected, transfer time required, the transfer begin/end time of a competing transfer to the same cinema. These are accomplished by a software application.

The method disclosed above may also include the step of identifying a plurality of DCP delivery slots at each cinema, wherein the number of delivery slots is based on the network setup for the cinema.

The method disclosed above may also include a step wherein delivery of the DCP is confirmed by the recipient prior to access being granted to the DCP.

The method disclosed above may also include a step wherein the KDM file includes data controlling the time period in which the DCP may be unlocked for projection.

A software as service method for distributing a digital representation of a cinematic production is disclosed herein comprising the step of producing a digital project file for each cinema production represented by a supply chain, wherein control of the project file is held by a project owner, wherein the project file provides the project owner continuous control over access to a digital cinema package (DCP), and wherein the project owner digitally controls the cinema's access to digital assets.

The method disclosed above may also include a step wherein the digital assets comprise a DCP and/or key delivery message (KDM).

The method disclosed above may also include a step wherein delivery of the DCP must be confirmed by the recipient prior to access being granted to the DCP.

DESCRIPTION OF THE PREFERRED EMBODIMENTS

Disclosed herein is an improved (digital) supply chain (ISC) product. To ensure continuity of understanding, the term "improved supply chain" will be used to identify this system, process, and hardware in several different embodiments. The disclosure covers a simple explanation of the improved supply chain as a service business model, a review of key digital cinema (D-Cinema) topics, a description of the Digital Cinema supply chain, and finally, a description of the improved supply chain product and process.

The improved supply chain product and process, in one form, is a Software as Service (SAS) model. This SAS model is contrary to the traditional software license model. As far as a customer is concerned, the difference between an SAS model and license model is for what they are billed. In a traditional license model, the customer pays the license fee for an application, allowing them to install and use the application for their commercial purposes. In some cases, a license model may also grant the customer rights to the application source code, which they may then modify for their own purposes. With an SAS model, the customer is billed based on transactional usage of the application. Typically, an SAS arrangement does not involve a specific client installation of the application. As a follow on, it does not allow for customer access to source code and custom modifications. In another form, the improved supply chain product and process functions as a license sale model.

Practically speaking, a traditional license model leads to an installed application instance for each customer under their control. Customers are then charged ongoing support and maintenance fees from the software vendor. In an SAS model, the software vendor retains control of all application instances (if there are multiple). This is similar to the many web applications becoming commonplace in the general consumer marketplace.

There are a number of advantages to the SAS model for simple transactional processing that do not constitute a competitive advantage for the customer, in one form. There may not be a long and costly installation and deployment process. There may not be a need to hire in specialty skills to support a new technology. There may not be a need to continually manage the testing and deployment of application patches and new releases issued by the software vendor. An SAS application can be brought online for the customer to begin used in a matter of a few weeks. Software patches and releases are tested and deployed by the vendor directly. Seeing as the vendor continues to manage the application installation, they maintain all skilled resources in-house.

The reasons why this system and process is important to the overall solution design will be discussed in more detail.

Digital Cinema (D-Cinema) Overview

Figure 1:
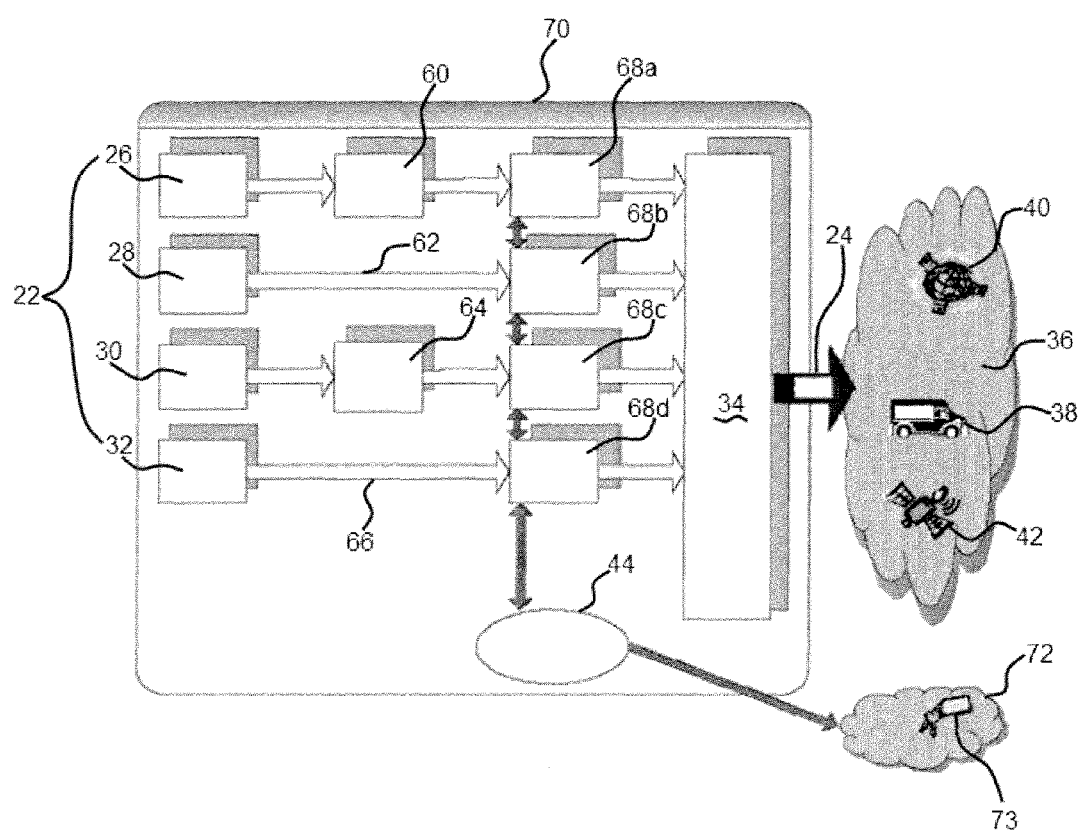
FIG. 1 is an overview flow chart of a digital cinema functional encode flow, from DCDM to transport, in one form.

Digital Cinema Initiatives articulates 4 major concepts, as depicted, in one form, in FIG. 1, associated with D-Cinema, which refer to the 'composition' flowing through 5 major activities:

Digital Source Master (DSM): The Digital Source Master (DSM) is created in post-production and can be converted into a Digital Cinema Distribution Master (DCDM) 22. The DSM can also be converted to a film duplication master, a home video master, and/or a master for archival purposes.

Digital Cinema Distribution Master (DCDM) 22: The DCDM is one output of the Digital Cinema post-production process (not to be confused with the feature post-production process, which creates the DSM) and may include the image structure 26, audio structure 28, subtitle structure 30, and captions structure 32. These structures are mapped into data file formats that make up the DCDM.

Digital Cinema Package (DCP) 24: Once the DCDM is compressed, encrypted and packaged for distribution, it is considered to be the Digital Cinema Package or DCP 24. This term is used to distinguish the package from the raw collection of files known as the DCDM. Shown below is a typical flow for Digital Cinema. When the DCP 24 arrives at the theater, it is eventually unpackaged, decrypted and decompressed to create the DCDM*, where DCDM* image is visually indistinguishable from the original DCDM image.

DSM→DCDM→DCP→DCDM*→Image and Sound

Composition: The term "composition" refers to all of the essence and metadata required for a single presentation of a feature, trailer, advertisement, or a logo to create a presentation using a digital system.

The five major activities that constitute those D-Cinema practices, in one form, are unique from traditional film mediums and for which specific standards have been articulated as follows.

Packaging 34: The DCDM is a collection of files, such as picture essence files and audio essence files. These files, as they stand by themselves, may not represent a complete presentation. Synchronization tools, asset management tools, metadata, content protection and other information are required for a complete presentation to be understood and played back as it was intended. This is especially important when the files become compressed and/or encrypted and are no longer recognizable as image essence or audio essence in this state. Packaging is a way to organize and wrap this material in such a way as to make it suitable for storage and transmission to its destination, where it can be stored and then easily unwrapped for a coherent playback.

Transport 36: Transport 36 refers to the movement of the packaged Digital Cinema content. This can be accomplished in many ways, for example physical media 38, Virtual Private Network (VPN) 40, or satellite 42. The following section will describe any requirements for the transport of packaged content.

Figure 2:
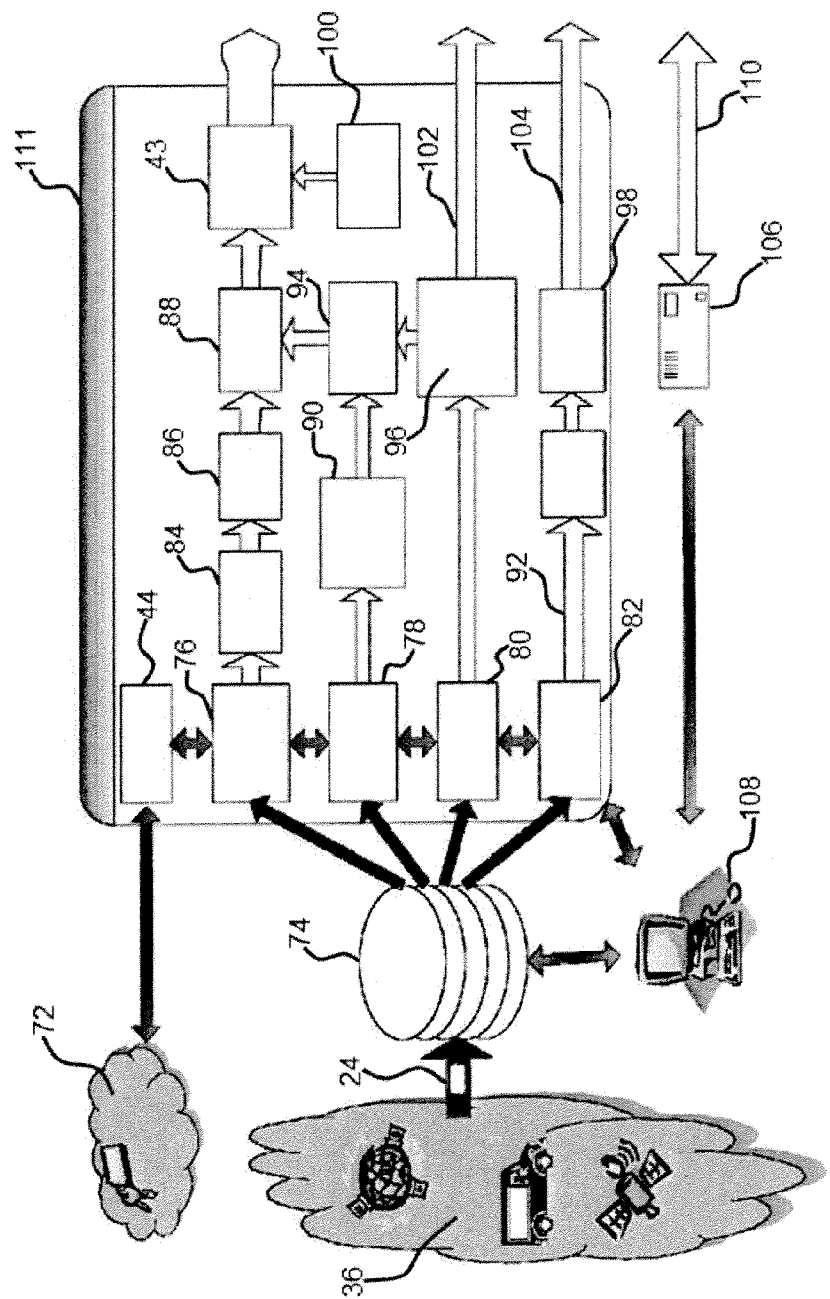
FIG. 2 is an overview flow chart of a digital cinema functional decode flow, from transport to cinema, in one form.

Theater systems for digital cinema incorporate all of the equipment required to make a theatrical presentation upon auditorium devices 110 within an auditorium located within a theater complex 128, in one form, as shown in FIG. 2. This system may encompass projectors 43, media blocks, security managers 44, storage, sound systems, DCP ingest, theater automation 106, Screen Management System (SMS) and Theater Management System (TMS). The Screen Management System (SMS) provides the theater manager a user interface for local control of the auditorium such as start, stop, select a Show Playlist and edit a Show Playlist. At a higher level is the Theater Management System (TMS). The TMS can control, supervise and report status on all of the equipment in the theater as well as perform all the duties of the SMS.

Security is provided primarily through the application of encryption technology and the management of content key access. When content is transported and received in an encrypted fashion, it is necessary to establish standardized methods of delivering and utilizing decryption keys to unlock the content. This is known as key management. Associated with key exchange is DRM (Digital Rights Management), which establishes the rules for using content. The management of DRM is known as security management. In practice, the key delivery message (KDM) file 73 is distributed to cinemas as the key management component. The KDM manages digital rights by controlling the time period in which a DCP 24 can be unlocked for projection. These rights are managed at a cinema location level with a unique KDM being issued for each cinema location receiving a DCP for commercial exhibition.

Figure 3:
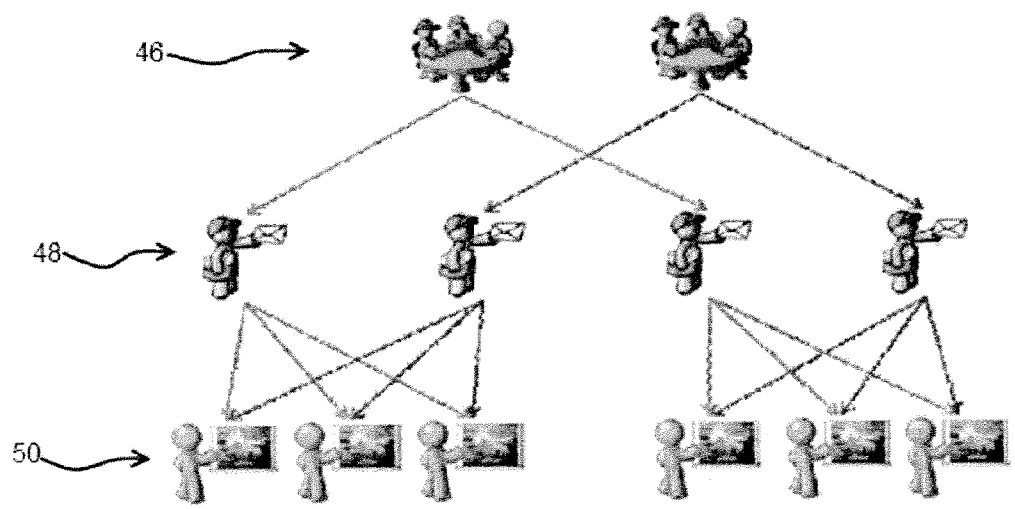
FIG. 3 is an overview flow chart of a digital supply chain, in one form.

There are 3 primary organizations involved with the D-Cinema supply chain, studio, distributor, and cinema (or exhibitor), as shown in FIG. 3.

Studio: The studio 46 produces the DSM during the post-production process. The studio also owns all rights to the digital compositions (assets) as they evolve and move through the supply chain. The studio contracts with a distributor to manage the distribution of compositions.

Distributor: The distributor 48 receives the DSM from a studio 46 and proceeds to create the DCDM 22. For a content release in the same country as the studio 46 (i.e., a US produced film released in the US), localization is typically not required by the distributor 48. In this case, the DCDM is easily created. Localization refers to activity such as the addition of subtitles for foreign language files or the addition of legal headers or trailers where required by local law and/or custom. In the case of needed localization, the distributor is responsible to complete all required files (such as a subtitle file) and incorporate them into the DCDM. When the correct DCDM is created for the distribution market, the distributor 48 then compresses and encrypts all components with a DCP 24 being the final output. The distributor is responsible for the distribution of the DCP to all cinema locations 50 under their contract. As a final step, the distributor is also responsible for the creation of the KDM file for each cinema location 50 receiving a DCP. As requests come in from cinemas to extend their exhibition agreement for a feature film composition, the distributor is responsible for creation and issuance of an updated KDM based on the agreed upon terms of extension.

Cinema: The cinema is responsible for taking possession of the DCP and loading it to their TMS. Following receipt of the KDM file 73, the cinema is then able to schedule exhibition times via their TMS/SMS. When the exhibition run is completed for which they have rights via the KDM, the cinema is responsible to dispose of the DCP according to the method in which it was received. If received via network/satellite, they should delete the DCP from their systems. If received via hard drive they should delete the DCP from their systems and return the source DCP to the distributor on the hard medium it was originally shipped.

FIGS. 1 and 2 show the functional flow of the D-Cinema lifecycle as published in the Digital Cinemas Initiative (DCI) System Specification v1.2, incorporated herein by reference. This specification is readily available, and many of the processes and explanations contained therein are assumed to be understood by one of ordinary skill in the art. These are provided for informational purposes only. The primary detail represented in these flows relates to D-Cinema activity outside of the transport activity. The disclosed improved supply chain provides services for the transport activity.

D-Cinema Transport: Current State of the Supply Chain

Evident in the DCI System Specification flows included above, the transport activity is essentially undefined. Beyond establishing three possible distribution methods (network, satellite or shipped physical media) there are no standards defined.

The predominant process used in D-Cinema today is the physical shipment of compositions on hard media. Where multiple celluloid reels making up a feature composition were shipped in the past, the industry has simply replaced the box of reels for a box containing a hard drive. Satellite distribution in many cases has proven cost intensive, both because of the initial hardware expense and the high data transfer costs.

Given the industry's poor response to satellite and current networked D-Cinema supply chain solutions, the opportunity remains to take advantage of annual savings in duplication and distribution costs across the industry. To achieve the desired savings, there is a need to find and develop a network supply chain solution that allows removal of the current reliance on physical media and legacy duplication processes. Such a network solution must provide control, visibility, security, data integrity, and reliability.

The improved supply chain approach:

The underlying principle behind the improved supply chain approach and a primary driver to build the application in an SAS model is envisioning the D-Cinema supply chain as a single global instance. Within this integrated global supply chain reside multiple channels representing each studio/distributor relationship. Multiple channels (based on global geography) converge on a single population of cinema locations. As an example, when you consider your local Regal Cinema Theater, they exhibit movies from most studios sent to them from multiple distributors. This is different than current approaches in the market which see D-Cinema having multiple linear supply chains, one supply chain for each studio/distributor relationship.

This convergence of supply chain channels at a cinema location presents two major problems. First, the inbound bandwidth to a single cinema location represents the limiting bottleneck in the supply chain. Second, given bandwidth constraints, the supply chain solution should maintain an open D-Cinema marketplace, ensuring all parties are provided an equal opportunity to release feature compositions on their own schedule and not be limited by what other competitors may be releasing to the market in the same timeframe.

The improved supply chain approach to maintain an open marketplace is through integrated management of the global D-Cinema supply chain. This is achieved through a single application instance deployed and offered to customers in an SAS model. This approach creates the opportunity for independent channels in the supply chain to operate autonomously while managing marketplace contention in the background. In so doing, the ISC application achieves the necessary reliability sought by film industry partners.

Figure 4:
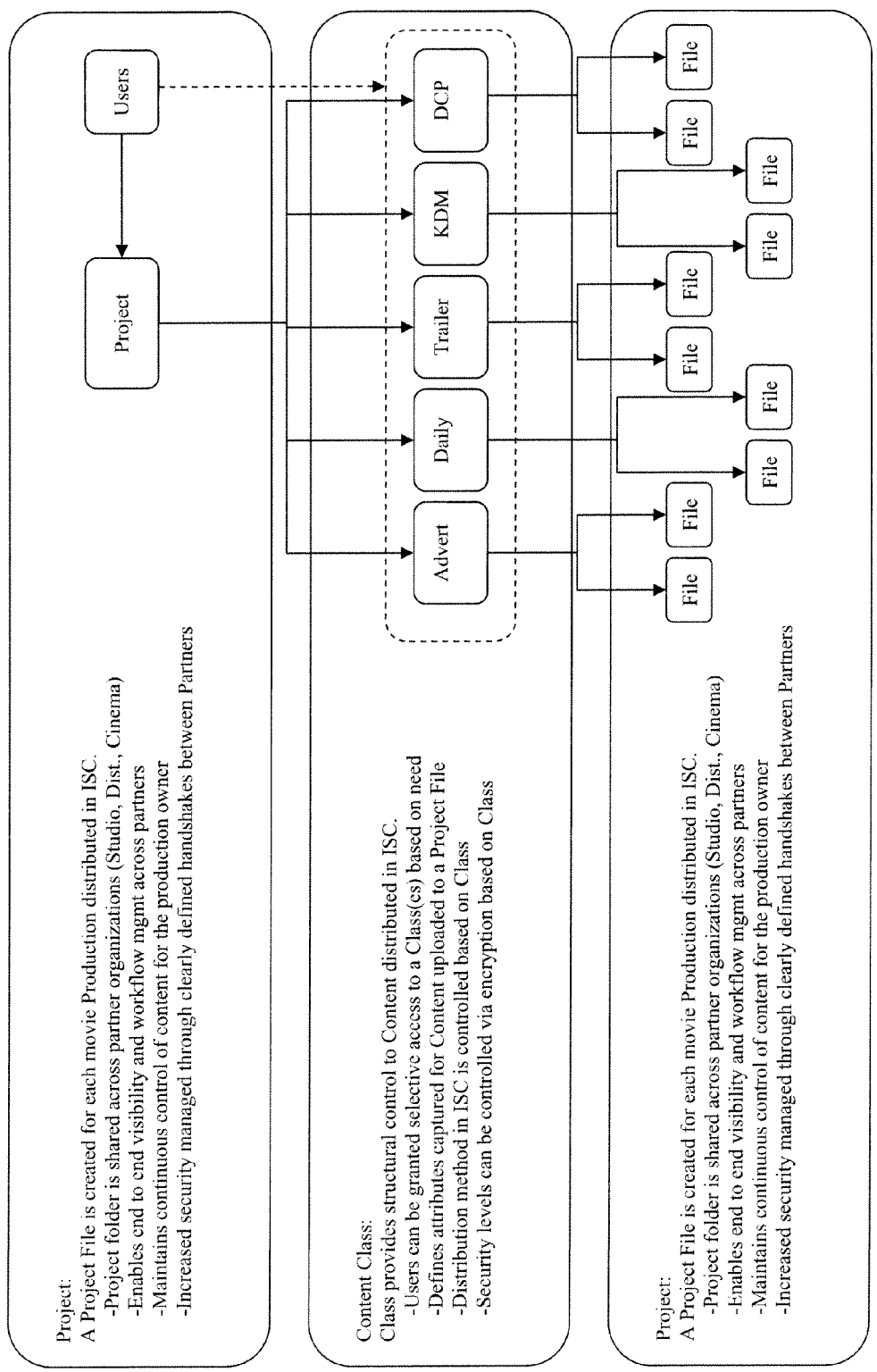
FIG. 4 is a content hierarchy chart, in one form.
Figure 5:
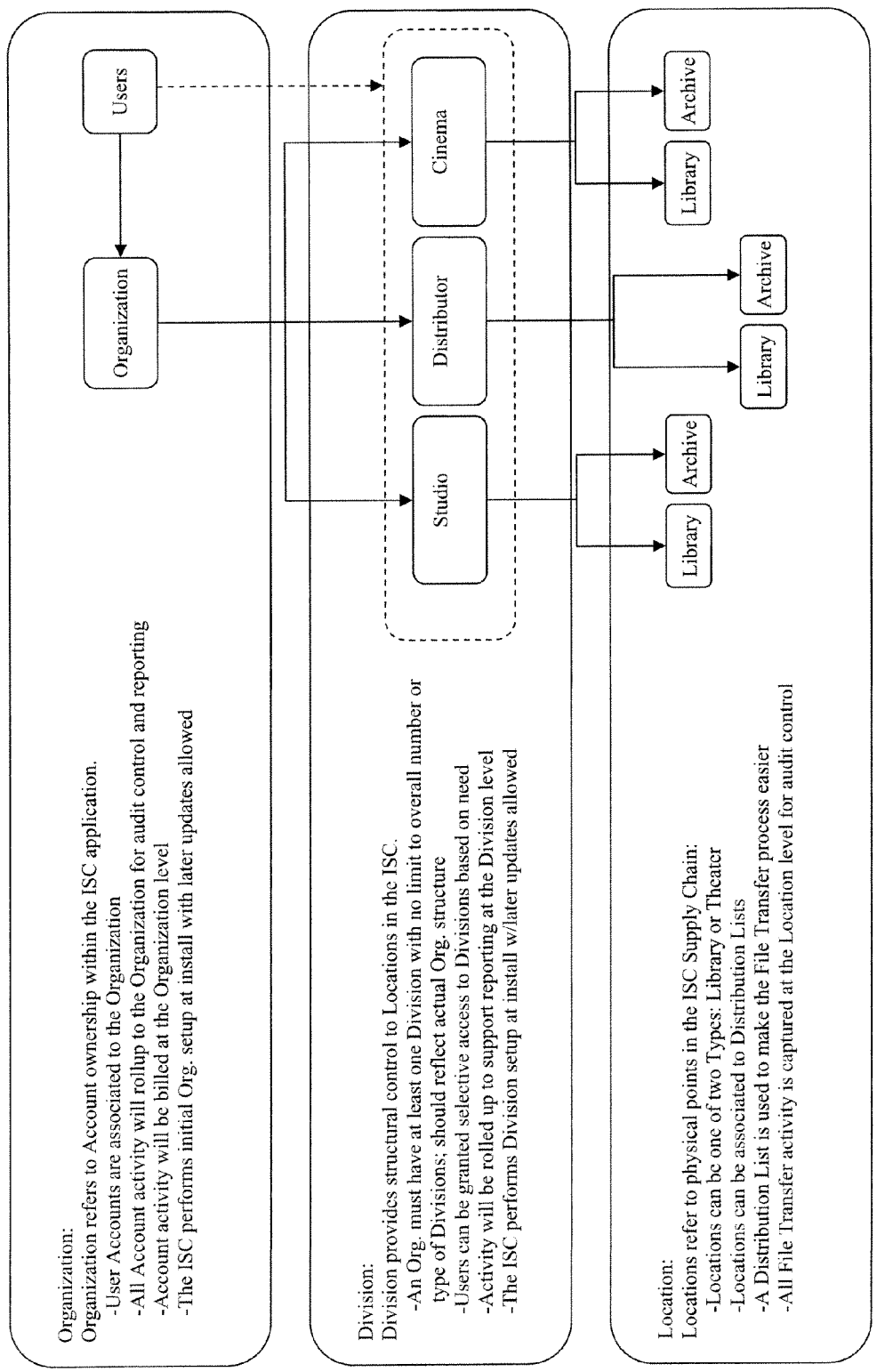
FIG. 5 is an organizational hierarchy chart, in one form.

Independent channels' autonomy and security is achieved, in one form, through two master data concepts: the content hierarchy 52, shown in FIG. 4, and the organizational hierarchy 56, shown in FIG. 5.

At the highest level of the content hierarchy 52 is the concept of a project file 54. At the highest level of the organizational hierarchy 56 is the organization 58. The intersection of organization and project through the user file (and each user's unique security rights) supports the functional capability to issue content (synonymous with DCI's "composition") into the supply chain while providing the asset owner the ability to control which supply chain partners (distributors, or other) have access to the content they are moving through the supply chain. Effectively, project file processes and user security create secure sub-channels through the supply chain.

Figure 6:
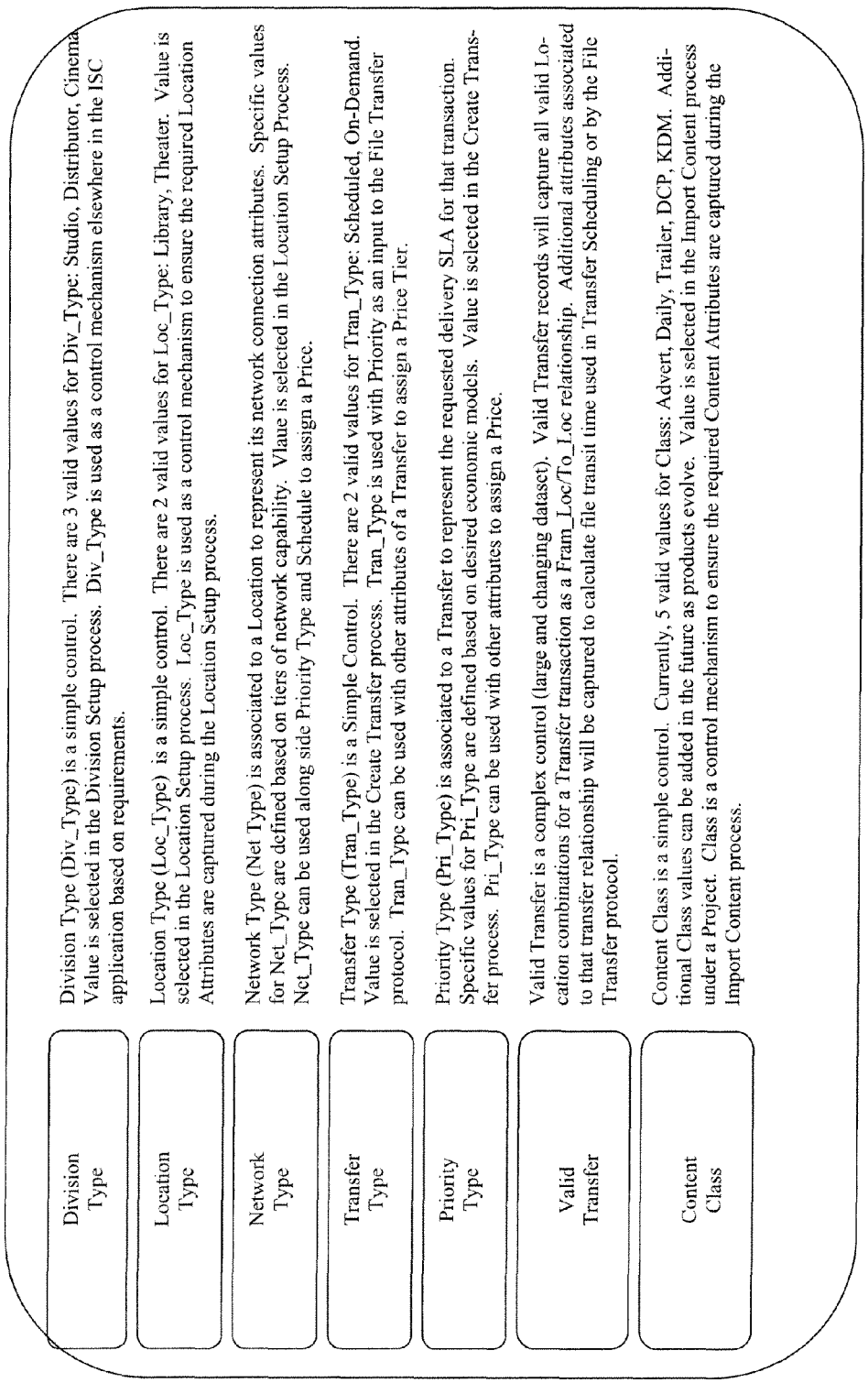
FIG. 6 is a chart of code control data elements, in one form.
Figure 7:
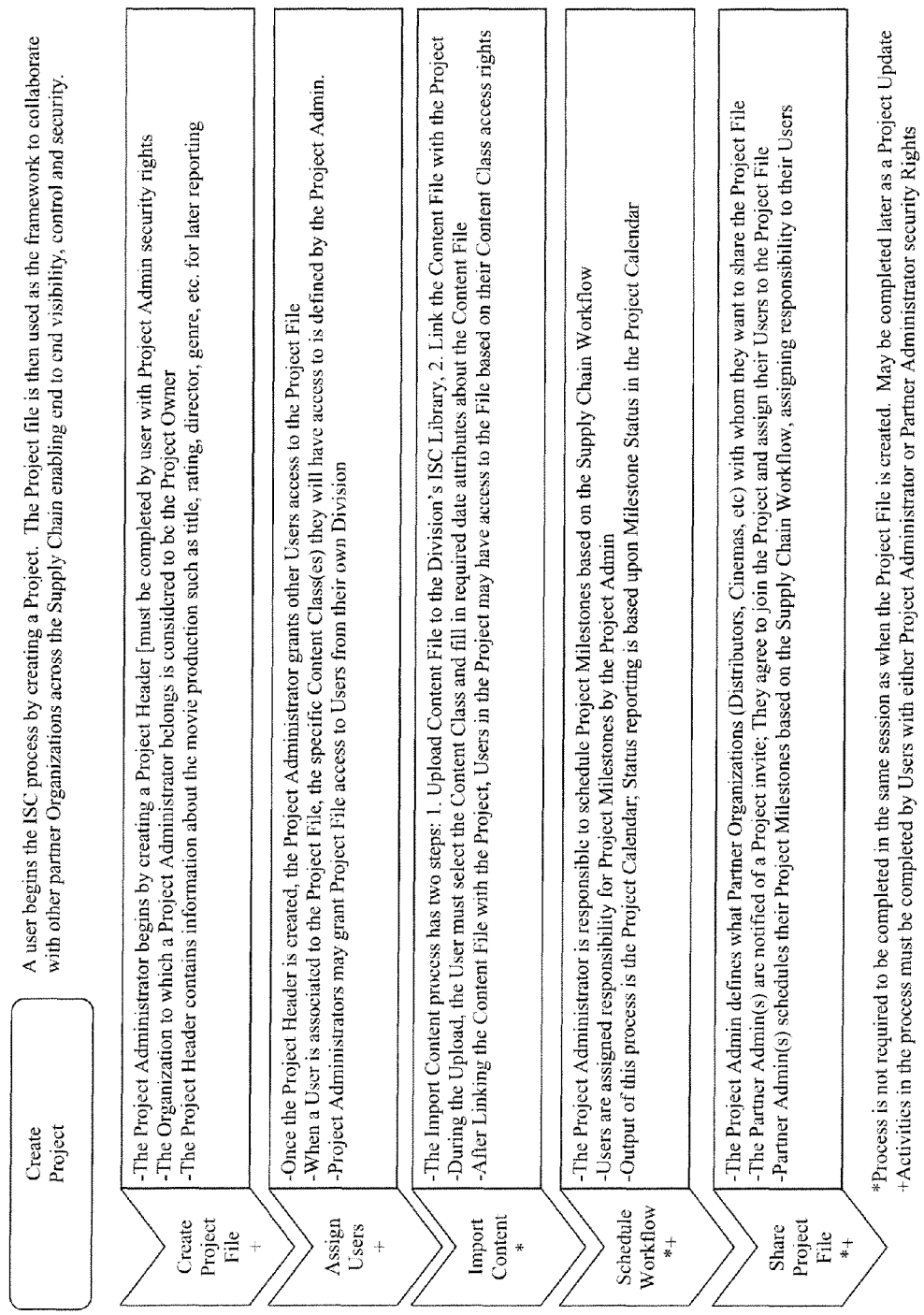
FIG. 7 is a process chart showing one form of the steps to create a project.
Figure 8:
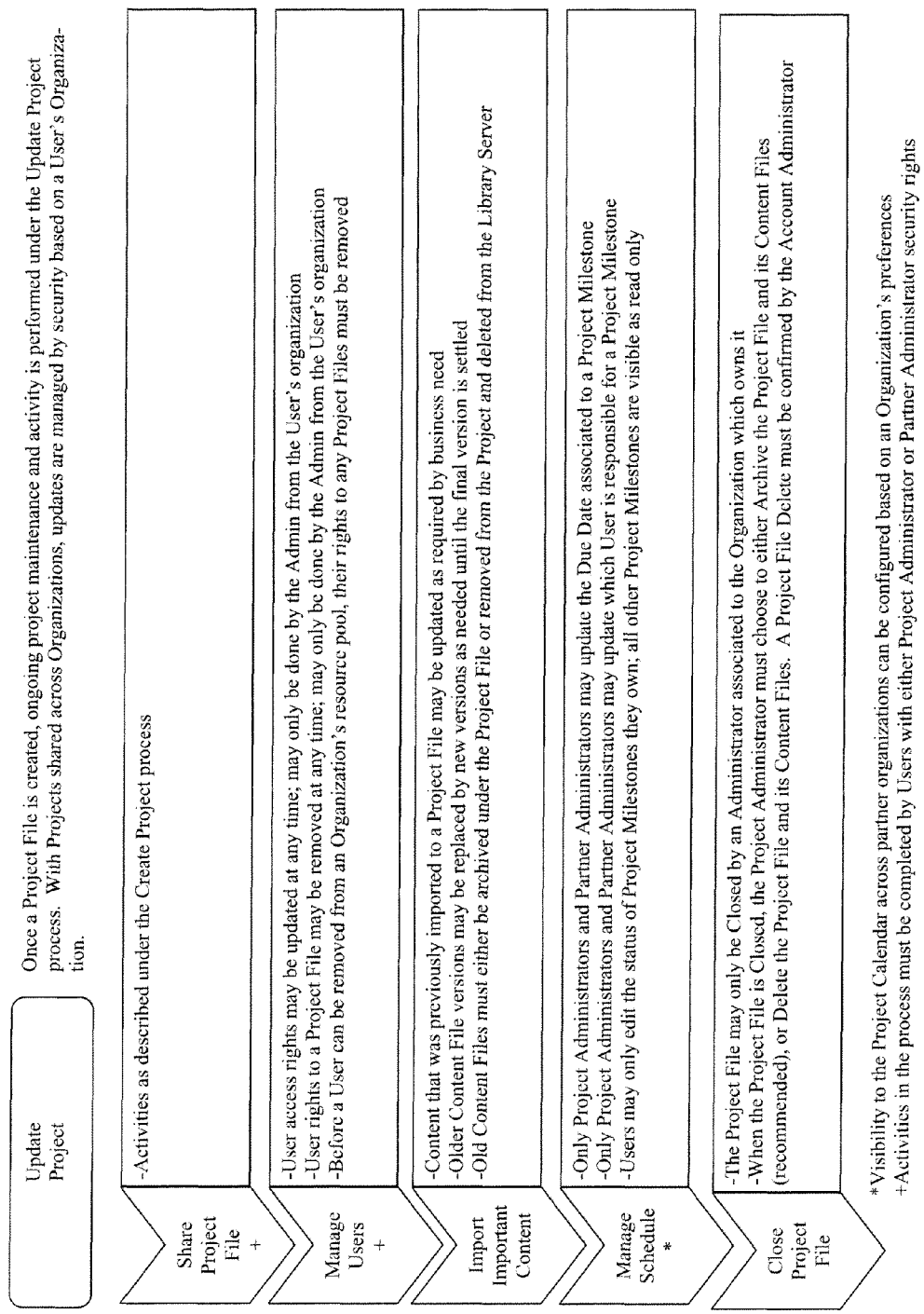
FIG. 8 is a process chart showing one form of the steps to update a project.
Figure 9:
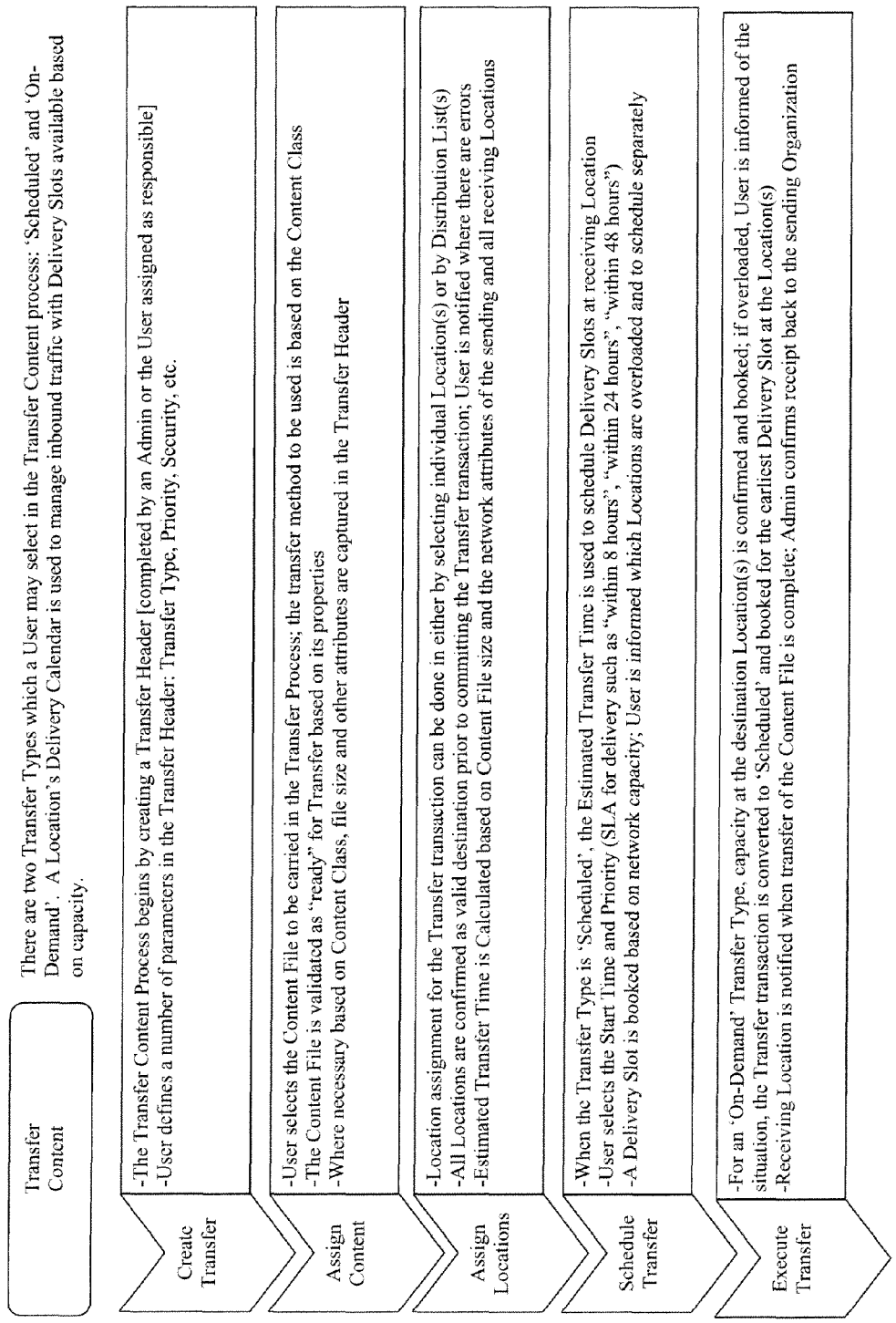
FIG. 9 is a process chart showing one form of the steps to transfer content.
Figure 10:
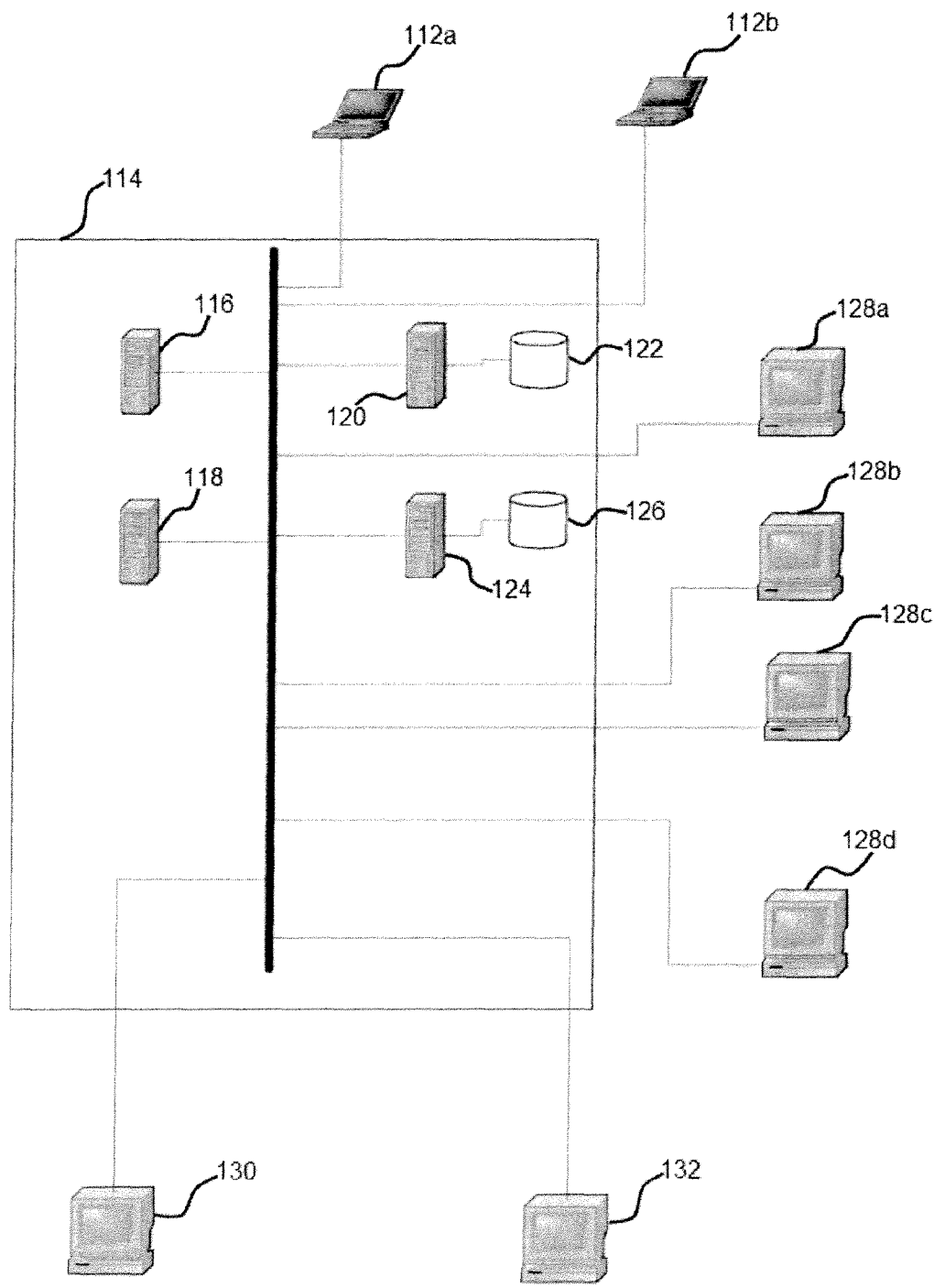
FIG. 10 is a chart of the arrangement of components of the disclosed system in one form showing the position of the components in an Internet architecture.
Figure 11:
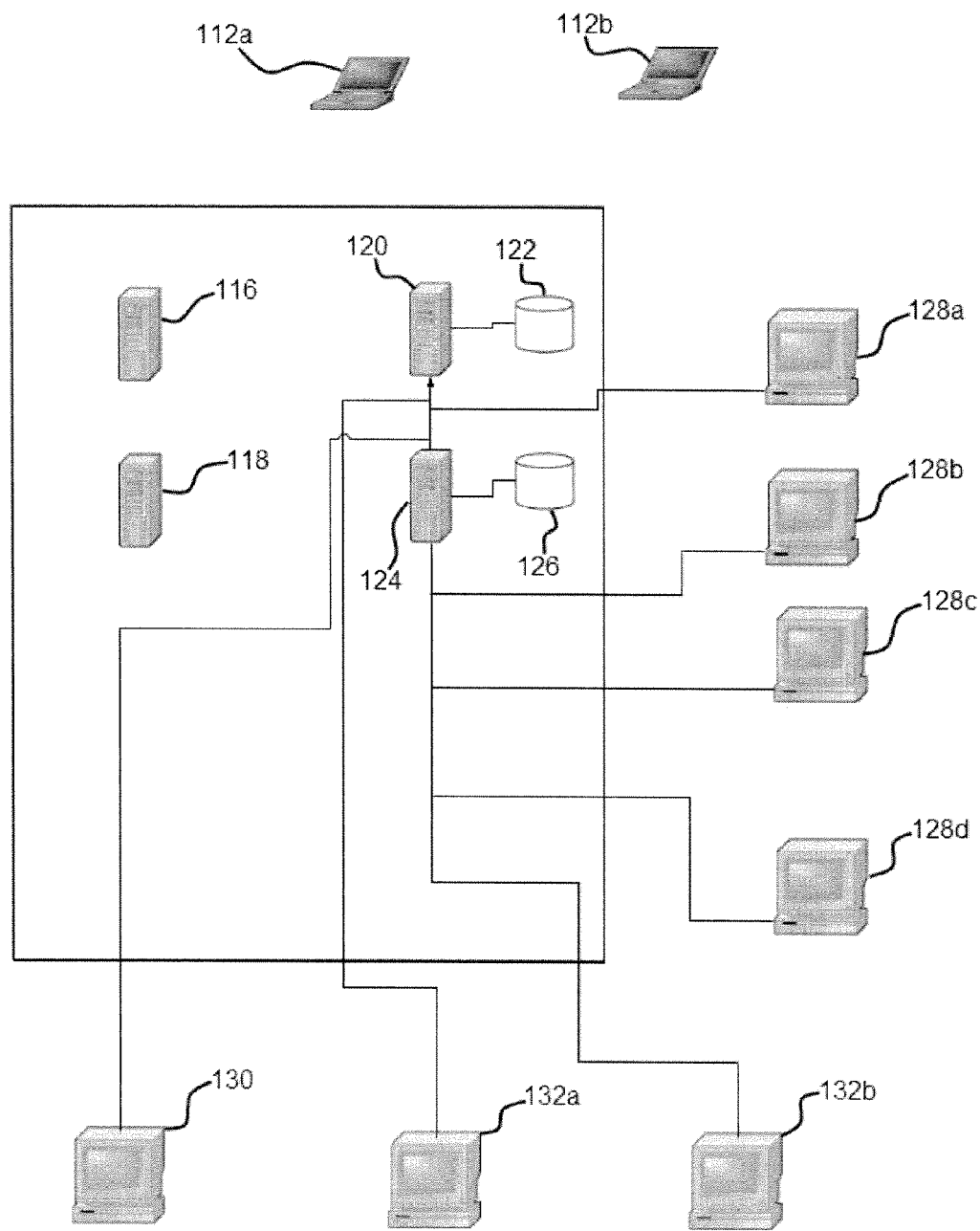
FIG. 11 is a chart of the arrangement of components of the disclosed system in one form showing the data flow between components.
Figure 12:
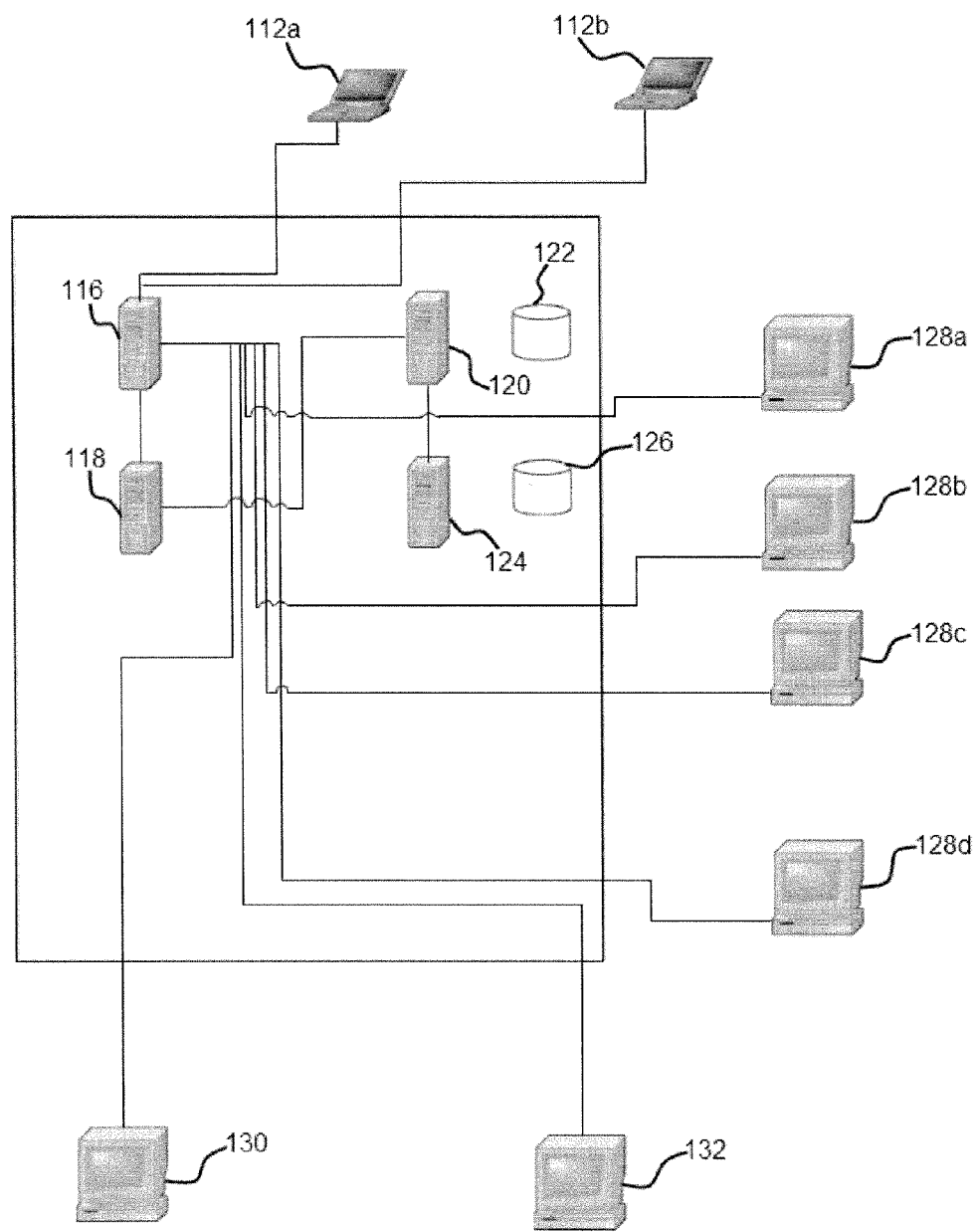
FIG. 12 is a chart of the arrangement of components of the disclosed system in one form showing the control flow between components.

Market contention is managed through a collection of data elements captured in the improved supply chain. Some of these data elements are related to control data setup within the application's database. These control data elements, in one form as shown in FIG. 6, are used for one of three purposes:

1. Control the data captured for a specific entity (i.e. location type)

2. Control the data input for a specific element (i.e. network type)

3. Control code logic during transactional processing (i.e. priority type or transfer type)

Considering the second type of control element, network type for example, the improved supply chain provisions a defined number of delivery slots into a theater location. The number of delivery slots is based on the network type setup for each individual theater location. An example network type for a theater may be "T1," in which case the improved supply chain assumes a maximum bandwidth into that location, in one form as 100 Mbps. With a minimum delivery slot provisioned to be 20 Mbps, the improved supply chain, in one form, then creates 5 concurrent delivery slots for that location.

While creating an advance scheduled transfer transaction in the improved supply chain, in one form, the user is able to book a delivery slot for the location. The improved supply chain in one form manages all open delivery slots and scheduled transfers at the location level in the form of the location's delivery schedule. As users book delivery slots, the location's delivery schedule is updated to prevent inbound contention at the time of transfer. As an added service, the user can book more than one provisioned delivery slot when scheduling a transfer transaction. However, a single user may not book all concurrent delivery slots for a location in order to maintain the open market.

Considering the third type of control element, priority type for example, the disclosed supply chain, in one form, can dynamically shuffle transfer transactions to manage competing priorities while maintaining the overall service level agreement (SLA) for a single transaction. When a user schedules a transfer transaction, they assign a start date along with its priority type. An example priority type is as follows: priority 1=12 hours, priority 2=24 hours, priority 3=48 hours, etc. For example, if User A schedules a transfer transaction (Tran A) to begin at 00:01 hours on March 24th with priority type 3, the agreed SLA is to complete delivery of the file transfer to the destination no later than 23:59 hours on March 25th. If User B then schedules a competing transfer (Tran B) to the same location to start at 04:00 hours on March 24th with priority 1 (delivery complete by 16:00 hours on the 24th), the improved supply chain is configured, in one form, to calculate if it can dynamically adjust Tran A (either start time or transfer flow rate) in order to deliver both transactions and meet the established SLA. If this is possible, Tran B is confirmed for User B and the location's delivery schedule is adjusted accordingly. If this adjustment cannot be made, the disclosed supply chain informs User B that the transfer cannot be committed as requested and indicates the next available delivery slot for that location.

The improved supply chain Project File

In addition to managing contention, a single instance of the improved supply chain process also provides the opportunity to implement the concept of a project file. The project file implemented in the improved supply chain provides the framework and processes that achieve the remaining industry goals of control, visibility and security.

Control: In one embodiment, a project file is set up in the improved supply chain for each movie production, which will move content of various types through the supply chain (feature film, trailers, advertisement, etc.). The improved supply chain process flow defines that the studio user (project administrator) creates the project file and functions as the project owner through its lifecycle in the improved supply chain process. As the project owner, the studio user in one form maintains unique rights designed to maintain control of the content and who has access to it. This is in line with the studio's continued ownership of the actual assets during their lifecycle.

The rights exclusive to the project owner, in one form, are the ability to share the project file with partner organizations in the supply chain (i.e. distributors) and the ability to close the project file at any point in its lifecycle. Maintaining control of project sharing allows the project owner continuous control over access to the project and its assets. With exclusive control over the project close function, the project owner has the ability to stop all asset movement if needed at any point. Additionally, when a project close is issued across the supply chain, any digital assets residing on partner organization library servers will be deleted. With this capability, the studio's project owner retains control of all digital assets throughout the project's lifecycle.

Visibility: Visibility is achieved through the shared project file. With a single application instance, visibility of all users and activity within a project file is easily managed and controlled without the need for complex messaging between multiple systems. As the project file is shared between partner organizations and new users granted access, the project owner maintains visibility to all activity.

The project calendar is continually updated as new partner organizations and their users add additional milestones. The project calendar is a single entity within the ISC. Again, this architecture aids in providing visibility to the project owner of all forward-looking project activities associated with their digital assets.

Security: A measure of security is provided for in the DCI specifications around the DCP itself in addition to the processes and tools used for key management such as the KDM file. Per the DCI specification, the DCP is a compressed and encrypted package. No additional compression or encryption is performed by the improved supply chain. The KDM effectively manages security around the contractually approved exhibition schedule between a studio/distributor and the cinema organization. The improved supply chain does not provide additional security requirements articulated in the DCI specification under key management.

The improved supply chain, in one form, provides security for a studio's digital assets through three primary capabilities: user management, project sharing and delivery confirmation.

User Management: At the core of the improved supply chain security, in one form, is the user file and effective management of user access, including the granting of selective rights to various types of content. User access to digital assets is managed in a series of tiers. The first tier is the user's direct relationship to an organization file. All users must belong to one, and only one, organization. Within that organization, a user is then granted selective rights to one or more divisions based on need. Management of user files and a user's granted security rights within an organization can only be performed by one role in the organization, the improved supply chain administrator.

After a user is granted rights within the organization and its divisions they still do not have explicit rights to access specific digital assets. This is separately managed through the project file. When a project file is created by the project administrator, they select which users within the organization/division they wish to grant access to content in the project. This access can be selective based on asset (content) type or universal access for all asset types. The organization should define business rules around which type of access is granted to users within a project file.

Project Sharing: When a project file is shared with a partner organization, in one form, an invitation to join the project is sent to the partner organization's improved supply chain's administrator (partner administrator). Through the project invitation, the partner administrator is asked to confirm a set of terms of agreement before they are granted rights to access project file content. The terms of agreement serve as a means to restate a commitment to the contractual relationship between the two organizations (such as a studio and its distributors). At the center of the terms is the commitment to protect the security and confidentiality of the studio's assets shared via the project file. This step in the process is in response to the industry's current challenges around content piracy. Additionally, this process reinforces the economic nature of feature film assets handled in the supply chain. These assets, in one form, can represent an investment of in excess of $200 million on the part of the studio with potential box office, DVD and other revenue reaching or exceeding $1 billion.

Following confirmation of the project sharing terms of agreement, the partner administrator is granted access to their view of the project file. From this point, the partner administrator then grants access to users in their organization in a similar manner as described above. The project owner gives visibility to users from the partner organization, which is granted access to the project file and its various content classes. If the project owner feels an inappropriate amount of access has been granted, they have the ability to suspend access to the project file for all users in the partner organization until the issue has been resolved.

Delivery Confirmation Similar to the terms of agreement confirmed by a partner admin when joining a shared project, the delivery confirmation process is intended to reinforce the contractual arrangement between organizations to the protection of the delivered digital asset. When a transfer transaction completes delivery of a content file to the recipient's content library, the partner administrator is sent a delivery confirmation message. Prior to being granted rights to access the content, the partner administrator is required to confirm successful receipt of the content file in addition to confirming agreement to the specific terms of agreement for the delivered content. This process establishes a formal handshake between organizations for content moving through the improved supply chain. When the delivery confirmation process is complete users in the partner organization who have been granted rights to the specific content class are able to access the content on their content library.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore I claim:

1. A software as service method for distributing a digital representation of a cinematic production comprising the steps of:
   a. a studio producing a digital source master (DSM) of the cinematic production on a non-transitory computer readable storage medium;
   b. the studio distributing the DSM to at least one distributor;
   c. the distributor producing a digital cinema distribution master (DCDM) from the DSM;
   d. the distributor compressing the DCDM to a digital cinema package (DCP);
   e. the distributor producing a key delivery message (KDM) unique to each DCP and cinema in the distributor's distribution chain;
   f. selecting the cinematic production represented by the DCP from a list of cinematic productions;
   g. selecting a priority type associated with delivery of the selected DCP;
   h. identifying a transfer begin and end time of the selected DCP;
   i. booking electronic delivery of the DCP to the cinema based upon the priority type selected, transfer time required, the transfer begin/end time;
   j. booking electronic delivery of the DCP based also upon the priority type selected, transfer time required, the transfer begin/end time of a competing transfer to the same cinema; and
   k. electronically delivering the DCP and KDM to the cinema.

2. The method of claim 1 wherein the steps of booking electronic delivery of the DCP to the cinema based upon the priority type selected, transfer time required, the transfer begin/end time; and booking electronic delivery of the DCP based also upon the priority type selected, transfer time required, the transfer begin/end time of a competing transfer to the same cinema; are accomplished by a software application.

3. The method of claim 1 further comprising a plurality of DCP delivery slots at each cinema, wherein the number of delivery slots is based on the network setup for the cinema.

4. The method of claim 1 wherein delivery of the DCP must be confirmed by the recipient prior to access being granted to the DCP.

5. The method of claim 1 wherein the KDM file includes data controlling the time period in which the DCP may be unlocked for projection.

6. The method of claim 1 further comprising the step of billing the cinema based on transactional usage of the software.

* * * * *